H. M. HERVEY.
Jack Scales.
No. 76,628.  Patented April 14, 1868.
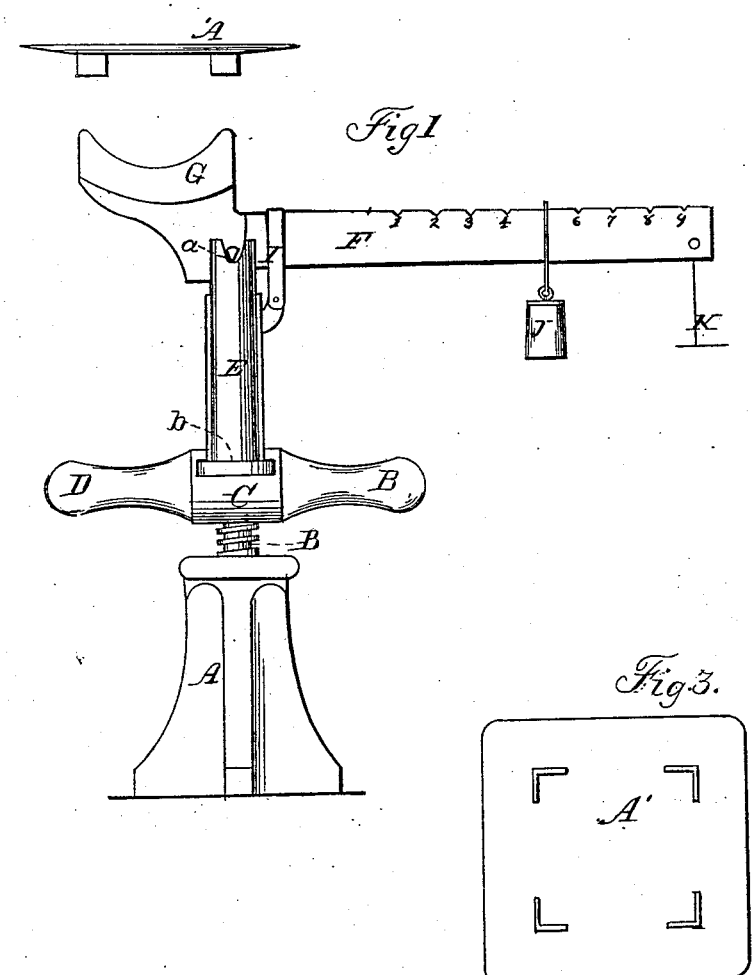

United States Patent Office.

H. M. HERVEY, OF MADISON, OHIO.

Letters Patent No. 76,628, dated April 14, 1868.

IMPROVEMENT IN JACK-SCALES.

*The Schedule referred to in these Letters Patent and making part of the same.*

---

TO ALL WHOM IT MAY CONCERN:

Be it known that I, H. M. HERVEY, of Madison, in the county of Lake, and State of Ohio, have invented certain new and useful Improvements in Jack-Scale; and I do hereby declare that the following is a full and complete description of the same, reference being had to the accompanying drawings, making a part of this specification, in which—

Figure 1 is a side view of the apparatus.
Figure 2 is a view of the top.
Figure 3 is a detached section.

Like letters of reference refer to like parts in the views.

In fig. 1, A represents a pedestal in which is secured a screw, B. C is a nut, fitted to the said screw, and operated by the handle D. E is a hollow standard in which the end of the screw is received, and by which the beam or scale F is supported on the pivots $a$, said pivots being the axis of vibration. G is the table of the scales, and is of the peculiar shape shown in the drawing, for a purpose hereafter shown.

It will be observed that the lower end of the standard E is provided with a flange, $b$, enclosed in a slot cut in the upper side of the nut, and so fitted as to allow it to turn freely therein, on working the nut in either direction for raising or lowering the scales.

The practical use of this apparatus is for weighing hay, grain, &c., when loaded up on the wagon, thereby saving the time and trouble of weighing the same before loading, and is especially designed for the use of farmers, who have not the benefit and use of the common platform-scales.

The application of this apparatus is as follows: The jack is placed under the axle-tree of the wagon so that it will rest upon and in the curve of the table G. The nut is then screwed up, thereby forcing upward the standard E. The effect of which will be to raise the axle and wheels, which will be borne by the short arm of the weigh-beam, the scale-arm being prevented from rising upward beyond a proper distance for weighing by the yoke I. The load is then weighed by the poise-weight J, in the ordinary way. Should the poise-weight be insufficient, additional weight can be added by placing them on the drop K.

A description of and the application of one jack-scale only has been described, but it will be obvious that in applying it to a wagon, two such will be required, one at each end, in order to lift the loaded wagon free from the ground.

This apparatus may be used simply as a lifting-jack for wagons, &c., by removing the beam, and if required for weighing articles not in a wagon, a flat platform, A', fig. 3, is placed upon the curved table G, on which the articles to be weighed are placed.

What I claim as my improvement, and desire to secure by Letters Patent, is—

The pedestal A, screw B, nut C, and standard E, as arranged in combination with the weigh-beam F, for the purpose and in the manner as set forth.

H. M. HERVEY.

Witnesses:
W. H. BURRIDGE,
J. HOLMES.